March 23, 1926.  
F. W. MORSE  
WEEDER  
Filed Nov. 27, 1923
1,577,927
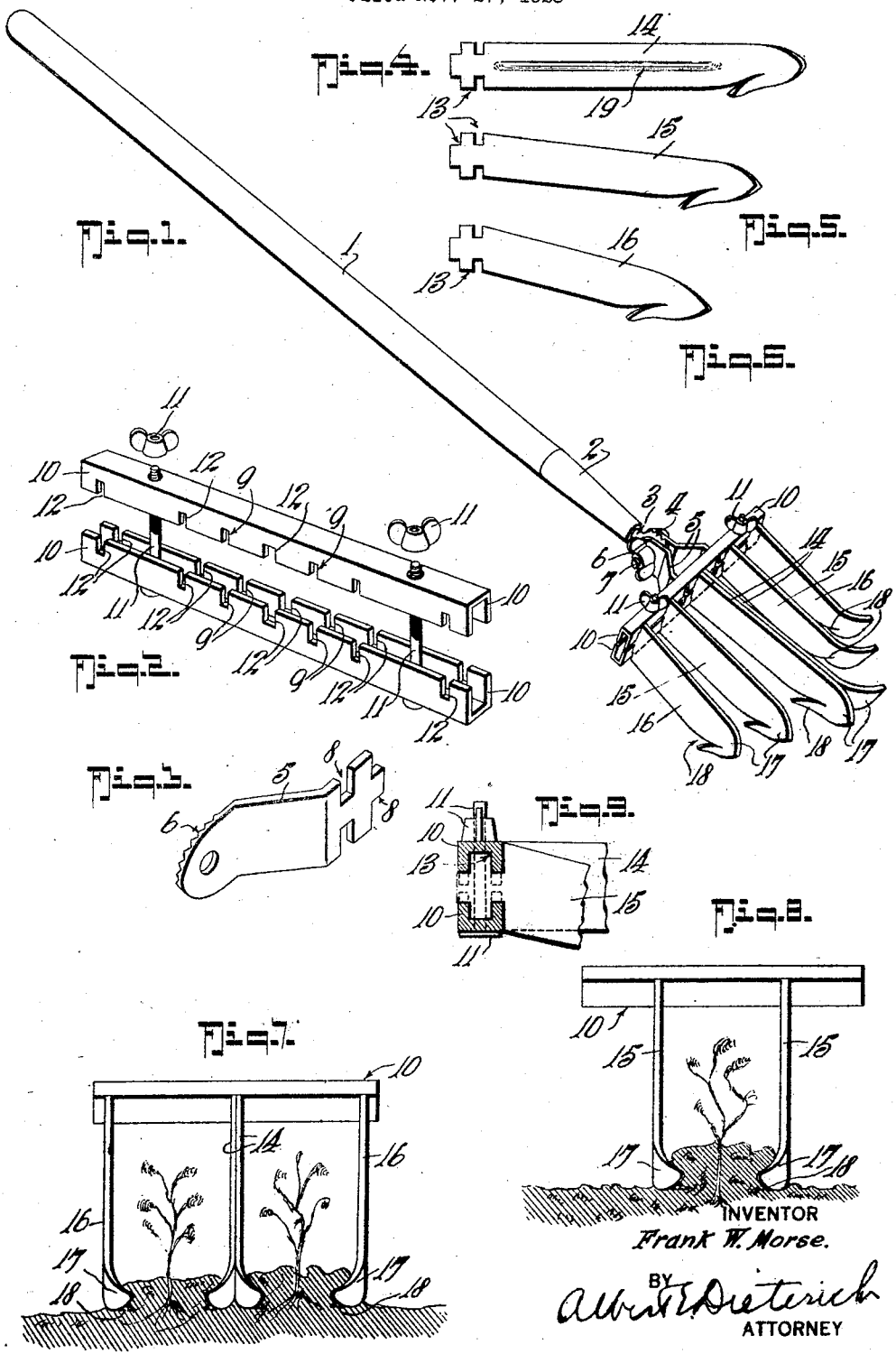
INVENTOR  
Frank W. Morse.  
BY Albert E Dieterich  
ATTORNEY Patented Mar. 23, 1926.

1,577,927

UNITED STATES PATENT OFFICE.

FRANK W. MORSE, OF SAN FERNANDO, CALIFORNIA.

WEEDER.

Application filed November 27, 1923. Serial No. 677,296.

*To all whom it may concern:*

Be it known that I, FRANK W. MORSE, residing at San Fernando, in the county of Los Angeles and State of California, have invented certain new and useful Improvements in Weeders, of which the following is a specification.

My invention has for its object to provide an improved construction of hoe for hand work in the garden for cutting weeds, cultivating and loosening up the soil, also for thinning out surplus plants and banking the same.

Primarily the invention has for its object to provide a device of the type stated which may be quickly taken apart reversed and reassembled to adapt the same for use to perform the various kinds of work required.

The invention further has for its object to provide a hoe the construction of which provides for the use of any desired number of interchangeable plow blades so constructed and cooperatively arranged that in case of small plants being sown six, eight or ten inches apart, two of the blades may be removed and the next two outer blades from the center changed from right to left, to enable the operator to hoe and bank two rows at one stroke.

Another object of the invention is to provide a device of the type stated, the construction of which is such that when the handle is tilted at a comfortable working angle, each plow share will engage with the level soil and in which each share, from the center outwardly, is set a little behind the adjacent share, allowing each share to turn a full furrow, and which is constructed so as to obviate the necessity of a land side by reason of the placing of a right and left plow share at each side of the center and the arranging of the right and left blades at respective sides of the said center.

A still further object of the invention is to provide a gang plow hoe of durable qualities and cheap in construction, and which while illustrated as constructed of stamped and died metal and being locked together by bolts and thumb nuts, a construction which permits a rapid change in the application of the hoe; it will be understood that a forged gang plow hoe may be constructed without departing from the spirit and the scope of the invention as particularly set forth in the appended claims.

Again, my invention has for its object to provide a gang plow hoe in which the parts are so correlated that a light pressure on the handle will cause the hoe to bury freely into the soil.

The invention also includes those novel details of construction, combination and arrangement of parts, all of which will be first fully described, and then be specifically pointed out in the appended claims, reference being had to the accompanying drawing, in which:

Figure 1 is a perspective view of the invention.

Figure 2 is a perspective view of the head device, the parts thereof being shown as separated.

Figure 3 is a detail perspective view of one of the opposing head supporting brackets.

Figures 4, 5 and 6 are detail side elevations of one of the central plow share blades, one of the intermediate plow share blades and one of the end plow share blades respectively.

Figures 7 and 8 are diagrammatic views illustrating the invention with the end plow share blades reversed for banking a double row of plants, and with the intermediate plow share blades reversed and cooperating for banking a single row of plants, respectively.

Figure 9 is a detail cross section illustrating the manner in which the blade ends are clamped to the supporting head.

In the drawing, in which like numerals of reference indicate like parts in all of the figures, 1 represents the handle of my improved gang plow hoe which is strengthened against splitting by the usual end ferrule 2 at the end of the said handle which is adapted to receive the supporting pintle 3.

The pintle 3 includes an enlarged, apertured and notched head 4. A pair of opposing supporting brackets 5 cooperate with the head 4 through the apertured ears 6 which have their opposing faces notched to cooperate with the similar faces of the said head 4 and to form an articulated joint therewith to permit of various adjustments of the implement, as hereinafter described, to which adjustments the brackets 5 may be securely held by the bolt and wing nut adjustment 7 (see Figure 1).

As will be apparent from Figure 3 of the drawing, the bracket plates 5 are each provided with a supporting head engaging end which is notched as at 8 to cooperate with the notches 9 formed in the opposing upper and lower U bars which form the two-part supporting head hereinafter referred to.

The opposing U bars 10 are adapted to be forced together or clamped to their clamping position by the bolt and wing nut adjustments 11, one thereof being positioned at each end of the supporting head (see Figures 1 and 2).

The opposing U bar members 10 are also provided with a plurality of registering notches 12 similar to those 9 for supporting the brackets 5, hereinbefore referred to, and when in their clamped relation the notches 12 are adapted to cooperate with the notched ends 13 of the blades of my improved gang plow hoe, which said blades are otherwise constructed in a manner to be later described in detail.

It will be readily observed that the centrally disposed notches 12 in the upper and lower U bars 10 are of twice the width of those to either side thereof, and from Figure 1 it will be observed that at this central point a pair of blades 14 are secured in cooperative relation with the supporting head. Intermediately positioned blades 15 are also provided, (see Figure 1) and are positioned one at either side of and properly spaced from the central blades 14, and still further over the end blades 16 are similarly spaced outward from the intermediate blades and adjacent the ends of the bars 10, as will clearly appear from the figure referred to.

By reference to Figures 1, 4 to 6, 7 and 8, it will be observed that each blade is provided at its end with a bent portion 17 so shaped as to form the blade ends into plow shares adapted, as the implement is drawn through the loose earth, to turn a furrow in accordance with the direction in which the bend is made. By reference to Figure 1, it will be observed that in the normal condition of the implement, that is, as an ordinary gang plow hoe for merely working the loose earth for turning over the same, the central blades 14 are so positioned with their plow share ends 17 turned in opposite directions so as to turn the furrows in opposite directions, and it will be similarly observed that the blades 15 and 16 at either side of the central blades each have their plow share ends 17 directed in the same direction in which the plow share end of the central blade nearest adjacent thereto is projected, or in other words, all of the blades at each side of the implement are directed in the same direction but in a direction opposite those at the opposite side of the center.

The plow share end of each blade may also be provided with a cut and outwardly turned portion 18 adapted to cooperate with that plow share portion, and which forms an effective weed cutting means, (see Figures 1, 4 and 8).

I have illustrated a structure in which the blades are interchangeably and reversibly secured to a supporting head adjustably mounted upon a handle. It will be readily understood that a forged or otherwise rigidly formed implement might also be constructed without transcending the scope of the appended claims. It will also be observed from Figure 4 that when the blades are constructed or stamped from sheet metal and it be desired that great rigidity be present therein a strengthening rib 19 may be provided as illustrated.

By reference to Figure 1 and to Figures 4 to 6 inclusive, it will be observed that the notches 13 formed in the blades 14 are cut at right angles to the length of that blade so that when securely clamped within the central notches 12, as illustrated in Figure 1, they will project in a plane normal to the front face of the said supporting head. By reference to Figure 5 it will be observed that the slots in the intermediate blades 15 are so cut that the said blades are caused to project from the supporting head at a slight angle so that the end of the said blades are directed toward a point below that at which the central blades are directed and by reference to Figure 6 it will be observed that the notches 13 of the outer blade 16 are so cut that these blades are caused to project from the supporting head at a greater angle than the blades 15 so that the ends of the blades 16 will be directed toward a point even below that point to which those 15 are directed. By reference to Figure 1, it will also be observed that the blades to either side of the central blades are successively shorter, thus making it possible for each blade to turn an independent furrow and, because of the varied angular projecting feature of the blades, as above described, all of the blades are caused to engage the ground at an approximate level which would not be the case were not the varied angle feature present.

By reference to Figures 7 and 8, it will be observed that my gang plow hoe is adaptable to special uses and not merely as a ground working furrow turning implement, as illustrated in the adjustment shown in Figure 1.

In Figure 7 is diagrammatically illustrated the manner in which the implement is adjusted to effect the banking of earth around a double row of small blades. In this adjustment, the central blades 14 are allowed to remain in the normal position illustrated in Figure 1, while the intermediate blades 15 are removed entirely and the outer blades 16 reversed, that is, positioned so that their plow share ends will turn a furrow inward toward the plant, as illustrated in this figure.

In Figure 8 is illustrated an effective adjustment of the implement for banking earth around a single row of small plants in which adjustment the central blades 14 and the outermost blades 16 are removed altogether and the intermediate blades 15 are reversed so their plow share ends 17 will turn the furrows inward toward the plants, as illustrated.

From the foregoing description, taken in connection with the accompanying drawings, it is thought the complete construction, operation and advantages of the invention will be readily apparent to those skilled in the art.

What I claim is:

1. A device of the class described comprising a handle, a blades supporting head adjustably carried by said handle, the said supporting head comprising a pair of opposing U bars each provided with clamping notches, means for forcing the said U bars toward each other in clamping relation, blades carried by said supporting head including notches for cooperating with the notches of the supporting head.

2. A device of the class described comprising a handle, a blades supporting head adjustably carried by said handle, the said supporting head comprising a pair of opposing U bars each provided with clamping notches, means for forcing the said U bars toward each other in clamping relation, blades carried by said supporting head including notches for cooperating with the notches of the supporting head, the notches formed in the said blades being so formed that the said blades are held in varied angles with relation to the supporting head.

3. A device of the class described comprising a handle, a blades supporting head carried by the handle and comprising two U bars adapted to set edges to edge lengthwise upon each other, bolts and nuts passing through said bars for clamping them together, each of said bars having clamping notches in their opposing edges, a series of blades carried by said supporting head and each consisting of flat plates having cross shaped ends to fit into the channels of said U bars and to project through the notches thereof substantially as shown and described.

FRANK W. MORSE.